United States Patent [19]

Ramskogler et al.

[11] Patent Number: 5,458,990
[45] Date of Patent: Oct. 17, 1995

[54] METHOD OF PROCESSING USED BATTERIES

[75] Inventors: Kurt Ramskogler, Raimund-Kraus-Gasse 6, A-2201 Gerasdorf; M. Chalostoria Giahi, Wien, both of Austria

[73] Assignee: Kurt Ramskogler, Gerasdorf, Austria

[21] Appl. No.: 244,532

[22] PCT Filed: Nov. 26, 1992

[86] PCT No.: PCT/AT92/00155

§ 371 Date: May 27, 1994

§ 102(e) Date: May 27, 1994

[87] PCT Pub. No.: WO93/11573

PCT Pub. Date: Jun. 10, 1993

[30] Foreign Application Priority Data

Nov. 27, 1991 [AT] Austria ................................ 2368/91

[51] Int. Cl.$^6$ .................................................. H01M 10/54
[52] U.S. Cl. .......................................................... 429/49
[58] Field of Search ............................................... 429/49

[56] References Cited

FOREIGN PATENT DOCUMENTS

| | | |
|---|---|---|
| 381808 | 12/1986 | Austria . |
| 0247023 | 11/1987 | European Pat. Off. . |
| 1112969 | 3/1956 | France . |
| 210819 | 6/1984 | Germany . |
| 61-281467 | 12/1986 | Japan . |
| 670015 | 4/1989 | Switzerland . |
| 676169 | 12/1990 | Switzerland . |
| 676896 | 3/1991 | Switzerland . |
| 2185348 | 7/1987 | United Kingdom . |

OTHER PUBLICATIONS

English language abstract of German Democratic Republic 210, 819.

*Primary Examiner*—Stephen Kalafut
*Assistant Examiner*—Richard H. Lilley, Jr.
*Attorney, Agent, or Firm*—Spencer, Frank & Schneider

[57] ABSTRACT

The invention relates to a method of processing used batteries, especially zinc-carbon and alkali-manganese batteries, in order to recover any usable or environmentally relevant substances, comprising the mechanical reduction of the initial material followed by the separation of the battery granulate thus obtained into a fine and a coarser fraction. The coarser fraction is further separated into a magnetic and a non-magnetic part, followed by principally wet chemical steps to sort out the fractions containing the individual useful or environmentally relevant substances and their separation.

6 Claims, No Drawings

METHOD OF PROCESSING USED BATTERIES

FIELD OF THE INVENTION

The invention relates to a method of processing used batteries, particularly zinc-carbon and alkali-manganese batteries, in order to recover usable or environmentally relevant substances contained therein.

TECHNOLOGY REVIEW

Primary batteries are used in numerous self-contained, portable devices as round, prismatic cells, and as button cells in large numbers.

Without a doubt, the breakthrough to modern, portable current sources was the configuration of zinc anodes as a cell box and the use of manganese dioxide as a positive electrode, and the idea of using a solid depolarizer (manganese dioxide) in place of a liquid one, the solid depolarizer being practically insoluble in the electrolyte solution. Depending on the battery system, ammonium chloride is used as the electrolyte, possibly with added zinc chloride, or diluted potassium chloride solution in batteries having zinc anodes. To suppress self-discharge, the zinc anodes are amalgamated with mercury salts. Additives such as copper and iron are only allowable in traces, while a specific percentage of lead and cadmium in precisely matched proportions of dimensions can contribute to the improvement in the zinc quality.

Primary batteries are only intended for one-time use. Up until a short time ago, after they had been exhausted, they were exclusively disposed of with normal household garbage or incinerated. This, however, caused environmental pollution. In recent times, these batteries are collected separately to an extent. However, destroying them in an environmentally-friendly manner causes great difficulties.

For a few years already, a focus of industrial battery production has been to recover the used batteries.

A decisive impetus for this was not initially environmental considerations, but economical reasons, i.e. recovery of raw materials such as zinc, ammonium and manganese.

Nevertheless, recycling makes an important contribution to environmental protection since, as mentioned, recycling prevents the organized as well as arbitrary deposit of dangerous or valuable substances, respectively, from used batteries.

Different methods of material recovery from unusable batteries are known from the art.

An example is FR 1,112,969. This document discloses a method of recovering metallic components from used dry cells, in which the batteries are destroyed in the course of precarbonization, and the contained chlorinated compounds are partially decomposed. The metal components of the unburned proportion are mixed with carbon-containing materials and agglomerated. The agglomerates are then subjected to a reduction treatment and subsequently an oxidation treatment, resulting in a manganese compound and zinc oxide. Zinc oxide is separated out of the combustion gases of the oxidation treatment. The chlorinated compounds remaining after precarbonization are destroyed during the reduction treatment and carried off as gaseous products.

In Indian Patent 127,714, the cells are opened and the reaction products are removed. The zinc is washed with hot water and melted with the addition of carbon at 800° C. This method is very work-intensive; moreover, no manganese is recovered.

In Japanese Patent 7,560,414, the reduced elements are dissolved in hot hydrochloric acid, and low-valent manganese is obtained in the presence of hydrogen peroxide. In Japanese Patent 74,106,419, the hydrochloric acid solution with ammonia is set at a pH value of 5, and iron-III-hydroxide is separated out. Whereas the batteries are reduced and subjected to wet screening and iron separation in the prestage in this patent, in accordance with Japanese Patent 75,01,094, the used dry cells are roasted for 8 hours at 750° C. in the presence of air and, following reduction, are dissolved to a fine powder in 20% hydrochloric acid.

A method of recovering zinc and manganese from exhausted zinc-carbon-manganese batteries is known from Austrian Patent 381,808. In accordance with this method, the battery granulate, possibly after previous extraction, is melted with solid, carbon-containing reducing agents and iron carriers as added substances in a reduction vessel at 1400°–1600° C., during which the zinc compounds contained in the resulting reaction gases, or metallic zinc and ammonium chloride are collected, and manganese is recovered as zinc-free ferromanganese.

Swiss Patent 670,015 describes a method of disposing of used primary batteries and recovering raw materials contained therein. This method encompasses a dual-stage, thermal decomposition process. The battery granulate is mechanically reduced as preparation for the thermal decomposition process, moistened with water, and the pH value of the moist battery mass is set to a value above 12. Ammonia and water are distilled off in a temperature range of 20°–150° C. In the second stage of the decomposition process, the batter mass is heated further, and mercury is distilled off in a temperature range of 350°–550° C. After complete cooling, the battery granulate, completely free from mercury, is again mechanically reduced. Subsequently, raw materials, mostly in the form of oxides, can be sorted by particle size, specific weight and magnetic behavior.

Swiss Patent 676,896 describes a method of disposing of and recovering material for unsorted, collected material from used alkali-manganese and zinc-carbon batteries, which method can also encompass small quantities of further battery types. After battery reduction, first the electrolyte salts are dissolved out of the mixture with water, and then gaseous ammonia is expelled from the wash water due to a temperature increase by means of the addition of strongly alkaline substances. This lowers the solubility of zinc, cadmium, mercury, copper, manganese and other metals that form ammonium complexes, and they precipitate out of the solution. The precipitated hydroxides or carbonates of these metals, or mercury oxide, are removed from the waste water and can be processed together with the fine fraction. The insoluble battery components are separated into a coarse fraction and a fine fraction by means of screening. The light plastic and paper parts are sorted out of the rough fraction by density, and iron granulate by means of magnetic separation. The powdery fine fraction is subjected to a thermal treatment. During this treatment the mercury is distilled out. After the thermal treatment, zinc is dissolved out of the residue with an aqueous solution. A separation between manganese and zinc is thus achieved, which permits further processing of the fine fraction into marketable products.

All of these methods of processing small batteries are associated with different drawbacks. In most of the known methods, the batteries are subjected to thermal treatment at higher temperatures in an oven. During the treatment of these types of complex substance mixtures, as they represent special garbage, particularly used battery waste, by heating to above 1000° C., the formation of further, undesirable substances or substance mixtures with possibly environmentally relevant properties cannot be ruled out.

However, there is no disclosure of the composition of the resulting waste gases, or the chemical reactions in the oven and their products as a result of the thermal treatment of such complex systems.

However, the methods that have become known are not practical until larger facilities are constructed. Technically, much can be accomplished today, but what can actually be implemented is primarily dependent on economic efficiency.

SUMMARY OF THE INVENTION

It is therefore the object of the invention to create a method of processing used batteries, particularly zinc-carbon and alkali-manganese batteries, in order to recover usable or environmentally relevant materials contained therein, which method overcomes the drawbacks of the known methods and permits the recovery, in an economical, practice-oriented form, of chemical elements present in the unusable cells, for example zinc and manganese, as well as other substances present therein or their compounds for which there is a technical application. At the same time, a complete and reliable form of recovery of environmentally relevant substances is intended to be permitted. Moreover, the method is intended to permit an economical processing of used batteries, even on a small scale.

DETAILED DESCRIPTION OF THE INVENTION

This object is attained in accordance with the invention by a method that encompasses mechanical reduction of the initial material and subsequent separation of the thus-obtained battery granulate into a fine fraction and a coarser fraction, the coarser fraction being further separated into a magnetic and a non-magnetic proportion, the method further including subsequent, predominantly wet-chemical steps to sort out the individual fractions containing usable or environmentally relevant substances and separating them.

The method is explained in detail below.

The foreign parts of the battery granulate, which make up approximately 1%, are sorted out on a primary screen and supplied to appropriate disposal, depending on the nature of the foreign material. This can be dumping, incineration or some other processing.

Further, the nickel-cadmium batteries and mercury-containing button cells, classified as recyclable (in quantities of approximately 6–7%), are sorted out on the screen, either manually or, if possible, magnetically. Hence, only zinc-carbon and alkali-manganese batteries remain for further processing. The sorted-out quantity of approximately 92% is now subjected to a reduction process.

Following mechanical reduction in a closed screen system, the battery granulate is first separated into two fractions, a fine fraction (particle size - 250 μm) and a coarser fraction.

The fine fraction, which is primarily composed of carbon, zinc dust and zinc compounds, as well as manganese compounds and ammonia compounds, makes up 60% of the total battery granulate and has approximately the following composition:

| zinc | 14.3% |
| iron | 4.57% |
| manganese | 23.2% |
| nickel | 0.3% |
| cadmium | 0.2% |
| lead | 0.1% |
| mercury | 0.08% |

The remainder consists of water and other chemical compounds.

The coarser fraction, which in addition to iron also contains metallic zinc, small quantities of manganese compounds and other inorganic substances, as well as organic components such as paper and plastics, is brought to a magnetic separator in order to separate out the iron. The coarse-grained fraction is composed of approximately 25% non-magnetic and approximately 15% magnetic parts (with respect to the total battery granulate).

The composition of the non-magnetic part is approximately:

| zinc | 37% |
| manganese | 3% |
| iron | 12% |
| nickel | 5.7% |
| lead | 1.8% |
| cadmium | 2.0% |
| copper | 0.35% |
| mercury | 0.01% |

The remainder is composed of water and inorganic compounds, as well as plastics and paper.

Following washing, the magnetic fraction has approximately the following composition:

| iron | 70.5% |
| zinc | 1.9% |
| nickel | 0.62% |
| mercury | 0.04% |

This magnetic fraction can be supplied, for example, to the steel industry after being washed out with water.

The non-magnetic, coarse-grained fraction is treated in the same manner as the fine-grained screening fraction, but separately because of the different reaction times.

The fine fraction collected in water immediately after screening is pumped into a zinc-recycling system in order to prevent dust formation. In the system, all of the zinc and zinc compounds are brought into solution as zincate. For this purpose, in accordance with the invention the pH value is set above 12 with sodium hydroxide solution. The setting of this pH value is moreover known to cause the aluminum chloride contained in the zinc-carbon batteries to convert into ammonium hydroxide.

Since, in accordance with the invention, the dissolution of the zinc in dry batteries includes an exothermic reaction, the temperature of the reaction mixture increases by approximately 10° C. This temperature increase has a favorable effect on the evaporation of the ammonia, which is concentrated to 30% in an ammonia washer. The obtained ammonium hydroxide solution can be supplied to the chemical industry.

Following the reaction time, which, depending on the fraction, lasts approximately 1 to 2 hours, but must be sufficiently long in any case in order to convert the total ionic and metallic zinc into zincate, the stirring mechanism of the system is shut off; in the coarse fraction, plastics, paper, sealing compounds and other swimming, primarily organic components are skimmed off and supplied to further purification. This part of the coarse-grained fraction is practically free from pollutants after purification, and can be conditioned for dumping in accordance with the suitable consolidation method.

The remaining reaction mixture, which contains the heavy, water-insoluble components such as manganese compounds, carbon, metals and metal compounds and the zinc dissolved in the strongly basic range, is filtered off. The liquid phase, which, even after filtering, still contains colloidally-dissolved manganese-oxygen compounds, is filtered via a sand filter. Zinc hydroxide precipitates out of this phase due to the pH setting. In accordance with the invention, the pH of 11 has proven very effective, because at this pH value zinc oxide is composed of very easily filterable crystals. The obtained zinc hydroxide, which still contains 0.2 weight-% lead and 0.02 weight-% manganese (with respect to the drying substance), is appropriately treated for further use.

For example, to obtain zinc and for galvanic zincking, the zinc hydroxide is dissolved as sulfate in sulfuric acid, and lead is to be separated out as water-insoluble lead sulfate.

The alkaline dissolution of zinc from dry batteries in accordance with the invention, and the resulting ammonia removal further have the advantage that the poisonous metal components, such as cadmium, manganese, nickel and copper, as well as very volatile mercury chloride convert to metal oxides, thereby reducing environmental pollution by mercury and other metals and their compounds.

The part of the two fractions that is insoluble in the alkaline range is now supplied together to further processing.

In a closed reaction container, the sludge is slurried with water, with the reaction temperature being maintained below 15° C., and a pH value of 1 is set with concentrated hydrochloric acid. At this pH value, all metals and metal compounds present in dry batteries are dissolved. The active carbon located on the surface of the reaction mixture is skimmed off and washed out, and the wash water can be set at the pH value suitable for a sulfide treatment, possibly with sodium hydroxide solution.

It has been seen in practice that this carbon is free from heavy metal ions after two washings. It can possibly be used for air-filter systems in industry after being dried. Likewise conceivable is use in the battery industry. Of course, this active carbon can also be suitable for burning.

The clear, acidic solution obtained after separation contains, in addition to manganese-II-chloride, other chlorides such as iron-II-chloride and cadmium-II-chloride, and mercury compounds.

Following is a detailed description of the composition of the manganese compounds that have resulted both during battery discharge and, most notably, after shredding, when the zinc is dissolved as a consequence of the reduction reaction. In accordance with the formula, the electrochemical reaction in cells, in which the chemical energy is free as electrical energy, and the reaction during dissolution of the zinc in the alkaline range, in which chemical energy becomes free as heat, can be summarized in the following manner:

$$Zn + 2\,MnO_2 + 2\,H_2O \longrightarrow Zn(OH)_2 + 2\,MnOOH$$

In the two arrangements, manganese dioxide converts in the end into low manganese oxide that is insoluble in the alkaline range. These oxides, in contrast to manganese dioxide, are practically insoluble in the alkaline range, as shown by the analysis of the alkaline zincate solution.

A separation of manganese-II-chloride as manganese dioxide in the acidic range can be effected electrochemically, along with other heavy metal ions, in accordance with CH 548,953, or manganometrically according to A. George (Ann. Chim. phys. [3]66 [1862]153/61, 159/60).

The course of the reaction runs magnometrically according to the empirical equation:

$$3\,Mn^{2+} + 2\,MnO_4^- + 2\,H_2O \longrightarrow 5\,MnO_2 + 4\,H^+$$

The potassium permanganate needed for the above reaction can be produced from a part of the manganese dioxide obtained in accordance with this method by means of melting with an approximately stoichiometric quantity of KOH under the influence of oxygen (W. Baronius, G. Marcy (Chem. Tech. [Leipzig] A8 [1966] 723/7).

$Mn^{II}$, which is very difficult to oxidize, is easily incorporated into the manganese dioxide, the majority of which precipitates out immediately. For this reason, the formal degree of oxidation x of the $MnO_x$ phase is always within "two." The values of x are very dependent on the representation conditions. With a pH value of 2 and a slight temperature increase to 40° C., the theoretical value of 2 is approached.

A Guyard (Chem. News 8 [1863]292/3; Bull. soc. chim. France [2]1 [1864]

Manganese dioxide is filtered off and washed out twice with water. After the foreign ions have been removed by means of washing, the pH value of the wash water can be set to 7 with sodium hydroxide solution. The manganese dioxide produced in this way can be used as a cathode depolarizer in dry batteries, or supplied to the chemical industry.

The acidic solution obtained after filtering off of the manganese dioxide is brought to a pH value that is suitable for further sulfide treatment with sodium hydroxide solution. The precipitated sulfides, among them mercury sulfide, are dumped after consolidation.

A mercury contamination of the zinc hydroxide and the manganese dioxide was not detected. Mercury compounds which precipitated as sulfides in the end were detected exclusively in the acidic solution after the precipitation of the manganese dioxide.

In the recovery of zinc and manganese from used batteries, these two selected methods are element-specific, and no other elements present in dry batteries can participate in the reactions. Because of already-known, suitable reaction conditions, a mixed crystal formation can be nearly completely suppressed during precipitation.

In this method of using the used batteries, which is based on wet-chemical steps, reactions and steps are selected that do not require a temperature increase, in contrast to already-known, thermal methods. The work space hazard and emissions are the only factors that must be considered. For this purpose, mechanical reduction and screening take place in a closed system, and the exhaust air is purified by way of a filter system, and finally by means of an active carbon doped with iodine and sulfur. Because of this filter system, the exhaust air is free from particles as well as any volatile battery components. The dissolution of the sludge after zinc separation is likewise performed in a closed system, in which the exhaust air is carried off by way of an exhaust air purification system, as described above.

What is claimed is:

1. A method of processing used batteries to recover substances contained therein, comprising:

mechanically reducing used batteries into battery granulate;

separating the thus-obtained battery granulate into a fine fraction and into a coarser fraction;

separating said fine fraction and said coarser fraction into a magnetic part and a non-magnetic part;

chemically separating zinc from a non-magnetic part by adjusting the pH value of a solution of said non-magnetic part above 12 to dissolve all zinc;

removing ammonia released by pH value above 12;

filtering said solution;

adjusting the pH value of the solution to 11; and filtering a zinc-containing precipitate.

2. The method as set forth in claim 1, including separating carbon after said zinc-containing precipitate has been removed, by adjusting the pH to a value of 1, and filtering the carbon from the surface of the solution.

3. The method as set forth in claim 1, including separating manganese by electrolysis.

4. The method as set forth in claim 3, including separating mercury compounds by sulfide precipitation.

5. The method as set forth in claim 1, wherein each substance is recovered without additional heating.

6. The method as set forth in claim 1, including further purifying each recovered substance.

\* \* \* \* \*